United States Patent
Jacobsen et al.

(10) Patent No.: US 7,271,226 B2
(45) Date of Patent: Sep. 18, 2007

(54) OLEFIN POLYMERISATION PROCESS

(75) Inventors: Grant Berent Jacobsen, Bouc Bel Air (FR); Brian Stephen Kimberley, Bouche du Rhone (FR); Sergio Mastroianni, Martigues (FR)

(73) Assignee: Ineos Europe Limited, Hampshire (GB)

( * ) Notice: Subject to any disclaimer, the term of this patent is extended or adjusted under 35 U.S.C. 154(b) by 0 days.

(21) Appl. No.: 10/525,730

(22) PCT Filed: Aug. 6, 2003

(86) PCT No.: PCT/GB03/03438

§ 371 (c)(1),
(2), (4) Date: Feb. 25, 2005

(87) PCT Pub. No.: WO2004/020488

PCT Pub. Date: Mar. 11, 2004

(65) Prior Publication Data

US 2005/0245699 A1 Nov. 3, 2005

(30) Foreign Application Priority Data

Aug. 29, 2002 (EP) .................. 02358020

(51) Int. Cl.
*C08F 4/6392* (2006.01)
*C08F 4/632* (2006.01)
(52) U.S. Cl. .................. 526/127; 526/134; 526/160; 526/161
(58) Field of Classification Search ................ 526/127, 526/134, 160, 161
See application file for complete search history.

(56) References Cited

U.S. PATENT DOCUMENTS 5,834,393 A * 11/1998 Jacobsen et al. ............ 502/152
6,548,443 B1 * 4/2003 Watanabe .................. 502/155
6,608,224 B2 * 8/2003 Resconi et al. .............. 556/27

FOREIGN PATENT DOCUMENTS

| WO | WO97/19959 | 6/1997 |
| WO | WO 99/28353 | 6/1999 |
| WO | WO99/28353 | * 6/1999 |

OTHER PUBLICATIONS

Koike, T., "Method for Manufacturing Olefin Polymer", European Patent Office, Patent Abstracts of Japan, JP 2001-302716, Oct. 31, 2001.
Michino, Y., "Production of Diene-Based Polymer", European Patent Office, Patent Abstracts of Japan, JP 07-033817, Feb. 3, 1995.
Watanabe, K., "Method for Producing Olefinic Polymer", European Patent Office, Patent Abstracts of Japan, JP 2001-294608, Oct. 23, 2001.

* cited by examiner

*Primary Examiner*—Roberto Rabago
(74) *Attorney, Agent, or Firm*—Finnegan, Henderson, Farabow, Garrett & Dunner, L.L.P.

(57) ABSTRACT

A process for the homopolymerisation of ethylene or the copolymerisation of ethylene and (a-olefins in a polymerisation reactor, said process carried out in the presence of a catalyst system comprising (a) a polymerisation catalyst and (b) an ionic activator is characterised in that an organometallic compound of a Group IIIB metal having at least one unit of formula: MçOçR or MçOçM where M is the Group IIIB metal and R is a hydrocarbyl group is added to the reactor. Preferred organometallic compounds include aluminoxanes and the process results in improved poison scavenging as well as advantages in activity profiles, catalyst activity and product characteristics. The process is particularly suitable for use with supported metallocene catalyst systems in the slurry or gas phase.

12 Claims, No Drawings

OLEFIN POLYMERISATION PROCESS

The present invention relates to polymerisation processes in particular to processes for the polymerisation of olefins and in particular to processes using supported metallocene catalysts. The present invention is particularly directed to gas phase polymerisation processes.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. There have been developed several different families of metallocene complexes. In earlier years catalysts based on bis (cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis (cyclopentadienyl) and mono (cyclopentadienyl) complexes have been described in WO 96/04290 and WO 95/00526 respectively.

The above metallocene complexes are utilised for polymerisation in the presence of a cocatalyst or activator. Typically activators are aluminoxanes, in particular methyl aluminoxane or compounds based on boron compounds. Examples of the latter are borates such as trialkyl-substituted ammonium tetraphenyl- or tetrafluorophenyl-borates. Catalyst systems incorporating such borate activators are described in EP 561479, EP 418044 and EP 551277.

The above metallocene complexes may be used for the polymerisation of olefins in solution, slurry or gas phase. When used in the slurry or gas phase the metallocene complex and/or the activator may be suitably supported. Typical supports include inorganic oxides eg. silica or polymeric supports may alternatively be used.

Examples of the preparation of supported metallocene catalysts for the polymerisation of olefins may be found in WO 94/26793, WO 95/07939, WO 96/00245, WO 96/04318, WO 97/02297 and EP 642536.

WO 98/27119 describes supported catalyst components comprising ionic compounds comprising a cation and an anion in which the anion contains at least one substituent comprising a moiety having an active hydrogen. In this disclosure supported metallocene catalysts are exemplified in which the catalyst is prepared by treating the aforementioned ionic compound with a trialkylaluminium compound followed by subsequent treatment with the support and the metallocene.

WO99/28353 describes similar polymerisation catalyst systems which optionally comprise organoaluminium compounds of formula $AlR_nX_{3-n}$ wherein R is typically alkyl group, X is halogen or an alkoxy group and n is 1, 2 or 3. The organoaluminium compounds are contacted with the other catalyst components as part of the catalyst preparation rather than separate addition to the activated catalyst. The organoaluminium compounds are used to prevent the active catalyst species from chemically bonding with the support material during the catalyst preparation.

Supported metallocene catalysts have been primarily used for slurry and gas phase processes. In such processes various additives may be added to the gas phase in order to improve the process or the characteristic of the resultant polymers.

For example EP 781300 describes the use of small amounts of-scavenger in gas phases processes catalysed by metallocenes to reduce the tendency of fouling and sheeting. Typical scavengers described for this purpose include organometallic compounds such as trialkylaluminium compounds and in particular triethylaluminium. The scavengers may be used during start-up or added continuously in specific amounts during the polymerisation process. The scavenger may be introduced directly or indirectly into the reactor or by any external means which allows the scavenger to enter the reactor. The metallocenes systems exemplified are those based on bis(cyclopentadienyl) complexes for example bis(1,3-dimethyl-n-butyl)cyclopentadienyl)zirconium dichloride/methylaluminoxane systems.

Such trialkylaluminium compounds may however deactivate certain metallocene catalyst systems for example metallocenes comprising monocyclopentadienyl complexes.

We have now surprisingly found that processes catalysed by certain polymerisation catalysts may be improved by the addition of certain organometallic compounds into the reactor.

Improved poison scavenging may be observed as well as advantages in activity profiles, catalyst activity and product characteristics.

Thus according to the present invention there is provided a process for the polymerisation of olefin monomers selected from (a) ethylene, (b) propylene (c) mixtures of ethylene and propylene and (d) mixtures of (a), (b) or (c) with one or more other alpha-olefins in a polymerisation reactor, said process being carried out in the presence of a catalyst system comprising (a) a polymerisation catalyst and (b) an ionic activator said process characterised in that an organometallic compound of a Group IIIB metal having at least one unit having the formula:

$$M\text{—}O\text{—}R \text{ or } M\text{—}O\text{—}M$$

where M is the Group IIIB metal and R is a hydrocarbyl group is added to the reactor.

Preferred organometallic compounds are those where the Group IIIB metal M is aluminium or boron and the hydrocarbyl group is a C1-C8 alkyl group for example methyl or isobutyl.

Preferred organometallic compounds having the unit M—O—R are metal alkoxides for example diethylaluminium ethoxide.

Preferred organometallic compounds having the unit M—O—M are aluminoxanes.

Suitable aluminoxanes include those well known in the art for example methyl aluminoxane (MAO). A particularly preferred aluminoxane for use in the process of the present invention is tetraisobutlyaluminoxane (TiBAO).

The organometallic compound may be added directly to the reactor or via any suitable feed lines to the reactor.

Preferably the organometallic compound may be injected into the reactor together with the polymerisation catalyst for example in a suitable solvent. In this latter method the organometallic compound may suitably be premixed with the activated polymerisation catalyst before addition to the reactor.

The organometallic compound may be added continuously to the reactor or may added intermittently.

The preferred molar ratio of organometallic compound to polymerisation catalyst (metal) is in the range 0.1:1 to 1000:1 and preferably 0.5:1 to 500:1 and most preferably 1:1 to 100:1.

The polymerisation catalyst according to the present invention may suitably be any polymerisation catalyst used in conjunction with an ionic activator. Polymerisation catalysts typically comprise compounds having a transition metal.

Suitable transition metal compounds may be those based on the late transition metals (LTM) of Group VIII for example compounds containing iron, nickel, manganese, ruthenium, cobalt or palladium metals. Examples of such compounds are described in WO 98127124 and WO 99/12981 and may be illustrated by [2,6-diacetylpyridinebis (2,6-diisopropylanil)FeCl$_2$], 2,6-diacetylpyridinebis (2,4,6-trimethylanil)FeCl$_2$ and [2,6-diacetylpyridinebis(2,6-diisopropylanil)CoCl$_2$].

Other catalysts include derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred polymerisation catalyst of the present invention is a bulky ligand compound also referred to as a metallocene complex containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

LxMQn where L is a cyclopentadienyl ligand, M is a Group IVA metal, Q is a leaving group and x and n are dependent upon the-oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl)zirconium dichloride, bis(pentamethyl)cyclopentadienyl dichloride, or may be bridged eg. ethylene bis(indenyl) zirconium dichloride or dimethylsilyl(indenyl)zirconium dichloride.

Other suitable bis(cyclopentadienyl) metallocene complexes are those bis(cyclopentadienyl)diene complexes described in WO 96/04290. Examples of such complexes are bis(cyclopentadienyl)zirconium (2,3-dimethyl-1,3-butadiene) and ethylene bis(indenyl)zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

CpMX$_n$ wherein Cp is a single cyclopentadienyl or substituted cyclopentadienyl group optionally covalently bonded to M through a substituent, M is a Group VIA metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

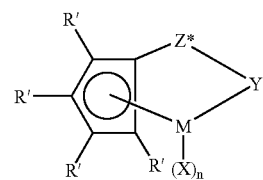

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms,
Y is —O—, —S—, —NR*—, —PR*—,
M is hafnium, titanium or zirconium,
Z* is SiR*$_2$, CR*$_2$, SiR*$_2$SIR*$_2$, CR*$_2$CR*$_2$, CR*=CR*, CR*$_2$SIR*$_2$, or
GeR*$_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system., and n is 1 or 2 depending on the valence of M.

Examples of suitable monocyclopentadienyl complexes are (tert-butylamido)dimethyl(tetramethyl-$\eta^5$-cyclopentadienyl)silanetitanium dichloride and (2-methoxyphenylamido)dimethyl(tetramethyl-$\eta^5$-cyclopentadienyl)silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium [tri (tertiary butyl)phosphinimine] dichloride.

Another type of polymerisation catalyst suitable for use in the present invention are monocyclopentadienyl complexes comprising heteroallyl moieties such as zirconium(cyclopentadienyl)tris(diethylcarbamates) as described in U.S. Pat. No. 5,527,752 and WO 99161486.

Particularly preferred metallocene complexes for use in the preparation of the supported catalysts of the present invention may be represented by the general formula:

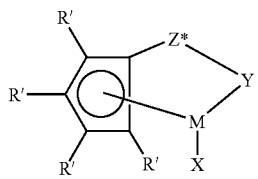

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or

GeR*$_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene; s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a $\pi$-complex as defined herein with the metal.

Most preferably R' is hydrogen, methyl, ethyl, propyl, butyl, pentyl, hexyl, benzyl, or phenyl or 2 R' groups (except hydrogen) are linked together, the entire C$_5$R'$_4$ group thereby being, for example, an indenyl, tetrahydroindenyl, fluorenyl, tetrahydrofluorenyl, or octahydrofluorenyl group.

Highly preferred Y groups are nitrogen or phosphorus containing groups containing a group corresponding to the formula —N(R")— or —P(R")— wherein R" is C$_{1-10}$ hydrocarbyl.

Most preferred complexes are amidosilane—or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido) (tetramethyl-$\eta^5$-cyclopentadienyl)dimethyl silanetitanium-$\eta^4$-1,3-pentadiene.

The ionic activators of the present invention typically comprise a cation and an anion and may be represented by the formula:

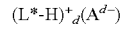

wherein
L* is a neutral Lewis base
(L*-H)$^+_d$ is a Bronsted acid
A$^{d-}$ is a non-coordinating compatible anion having a charge of d$^-$, and
d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations e.g. triethylammonium, tripropylammonium, tri(n-butyl)ammonium and similar. Also suitable are N,N-dialkylanilinium cations such as N,N-dimethlanilinium cations.

The preferred ionic compounds used as activators are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate.

A preferred type of ionic activator suitable for use with the metallocene complexes of the present invention comprise ionic compounds comprising a cation and an anion wherein the anion has at least one substituent comprising a moiety having an active hydrogen.

Suitable activators of this type are described in WO 98/27119 the relevant portions of which are incorporated herein by reference.

Examples of this type of anion include:
triphenyl(hydroxyphenyl)borate
tri (p-tolyl)(hydroxyphenyl)borate
tris (pentafluorophenyl)(hydroxyphenyl)borate
tris (pentafluorophenyl)(4-hydroxyphenyl)borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogenated tallow alkyl)methylammonium and similar.

Particular preferred activators of this type are alkylammonium tris(pentafluorophenyl)4-(hydroxyphenyl)borates. A particularly preferred activator is bis(hydrogenated tallow alkyl)methyl ammonium tris (pentafluorophenyl) (4-hydroxyphenyl)borate.

With respect to this type of activator, a preferred compound is the reaction product of an alkylammonium tris (pentafluorophenyl)-4-(hydroxyphenyl)borate and an organometallic compound, for example triethylaluminium.

The preferred metal with respect to the organometallic compound is aluminium and the preferred metal for the ionic activator is boron whereby the molar ratio of Al/B is less than 2:1. The molar ratio of polymerisation catalyst to ionic activator employed in the method of the present invention may be in the range 1:10000 to 100:1. A preferred range is from 1:5000 to 10:1 and most preferred from 1:10 to 10:1.

It is most preferred in the present invention that the polymerisation catalyst and ionic activator are supported.

Suitable support materials include inorganic metal oxides or alternatively polymeric supports may be used.

The most preferred support material for use with the supported catalysts according to the process of the present invention is silica. Suitable silicas include Ineos ES70 and Grace-Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The support material may be further combined with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Alternative supports for the present invention are non-porous polystyrenes for example divinylbenzene crosslinked polystyrene.

Preferred supported polymerisation catalyst systems for use in the process of the present invention include those described WO 02/06357 and the aforementioned WO 98/27119.

The process of the present invention may be directed to the solution, slurry or gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

The preferred process for the present invention is the gas phase.

Suitable gas phase processes of the present invention include the polymerisation of olefins, especially for the homopolymerisation and the copolymerisation of ethylene and α-olefins for example 1-butene, 1-hexene, 4-methyl-1-pentene are well known in the art. Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

The present invention will now be further illustrated with reference to the following examples:

| Abbreviations | |
|---|---|
| TEA | triethylaluminium |
| TiBAO | tetraisobutylalvminoxane |
| Ionic Activator A | $[N(H)Me(C_{18-22}H_{37-45})_2][B(C_6F_5)_3(C_6H_4OH)]$ |
| Complex A | $(C_5Me_4SiMe_2N^tBu)Ti(\eta^4$-1,3-pentadiene) |

EXAMPLE 1

To a toluene solution of Ionic Activator A (1.2448 g, 90.6 μmol) was added hexane (0.5108 g) followed by TEA in toluene (0.0709 g, 155 μmol). The mixture was left to stand for 30 minutes and was then added dropwise to TEA treated silica (3.0238 g, 1.4 mmol Al/gSiO2), to which hexane (0.4012 g) bad been previously added. The silica was agitated during addition and agitation was continued until no lumps were visible. The impregnated silica was allowed to stand at ambient temperature for 1 hour. To a heptane solution of Complex A, (0.4708 g 91.8 μmol) was added hexane (0.3982 g). The solution containing Complex A was added dropwise to the Ionic Activator A impregnated silica. The silica was agitated during addition and agitation was continued until no lumps were visible. The impregnated silica was allowed to stand for 1 hour during which time the silica became green. To the silica was added hexane (15 ml) and the slurry was agitated to ensure thorough mixing and left to stand at ambient temperature for 30 minutes. Silica was collected by filtration and washed with 2×15 ml of hexane. Residual hexane was removed under reduced pressure and pumping was continued for 1 hour after fluidisation ceased. The dry, green free flowing powder was transferred to a storage bottle for subsequent use in polymerisation reactions.

0.1 mmol of TiBAO (1M solution in a mixture of hexane and pentane) and 0.101 g of the above catalyst were pre-mixed (<1 hour) in a catalyst injection vessel and the resulting mixture used as such in a polymerisation reaction.

EXAMPLE 2

The procedure of Example 1 was followed except that the catalyst was treated with 0.1 mmol of diethylaluminium ethoxide instead of TiBAO and used as such in a polymerisation reaction.

EXAMPLE 3 (COMPARATIVE)

The procedure of Example 1 was followed except that the catalyst was premixed with 0.1 mmol. of triethylaluminium instead of TiBAO and used as such in a polymerization reaction Polymerisation Data The catalysts from Examples 1 and 2 were tested for ethylene 1-hexene copolymerisation as follows:

A 2.5 l double jacketed thermostatic stainless steel autoclave was purged with nitrogen at 70° C. for at least one hour. 200 g of PE pellets (previously dried under vacuum at 80° C. for 12 hours) or 250 g of NaCl (previously dried under vacuum at 400° C. for 12 hours) were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving. Typical conditions are as follows:

Temperature: 70° C.
Ethylene pressure: 6.5 b
P(1-hexene)/P(ethylene): 0.004-0.008
Hydrogen: 70-100 ml added during the gas phase composition

| Catalyst | Seed Bed | Average Activity (g/g · h · bar) | Activity at 1 h (g/g · h · bar) |
|---|---|---|---|
| Example 1 | NaCl | 77 | 60 |
| Example 2 | PE pellets | 44 | 10 |
| Example 3 | NaCl | 13 | 0 |

The invention claimed is:

1. A process for the polymerisation of olefin monomers, comprising polymerising an olefin monomer selected from the group consisting of (a) ethylene, (b) propylene, (c) mixtures of ethylene and propylene, and (d) mixtures of (a), (b), or (c) with one or more other alpha-olefins in a polymerisation reactor in the presence of a catalyst system including (a) a polymerisation catalyst, (b) an ionic activator having a cation and an anion, wherein the anion has at least one substituent comprising a moiety having an active hydrogen, and (c) an organometallic compound of a Group IIIB metal having at least one unit of formula:

M—O—R or M—O—M where M is the Group IIIB metal and R is a hydrocarbyl group, wherein an activated catalyst component including the polymerisation catalyst (a) and the ionic activator (b) is first prepared, dried and then the organometallic compound (c) is premixed with said dried activated catalyst component as a separate component before the resulting mixture is added to the reactor as the catalyst system.

2. The process according to claim 1, wherein the Group IIIB metal is aluminium or boron.

3. The process according to claim 1 or 2, wherein the organometallic compound is an aluminoxane.

4. The process according to claim 3, wherein the aluminoxane is tetraisobutylaluminoxane.

5. The process according to claim 1, wherein the organometallic compound is a metal alkoxide.

6. The process according to claim 5, wherein the metal alkoxide is diethylaluminium ethoxide.

7. The process according to claim 1, wherein the molar ratio of the organometallic compound to a metal content of the polymerisation catalyst is in the range of from 0.1:1 to 1000:1.

8. The process according to claim 7, wherein the molar ratio of the organometallic compound to the metal content of the polymerisation catalyst is in the range of from 1:1 to 100:1.

9. The process according to claim 1, wherein the polymerisation catalyst is a metallocene.

10. The process according to claim 9, wherein the metallocene has the formula:

CpMX$_n$ wherein Cp is a single cyclopentadienyl or substituted cyclopentadienyl group optionally covalently bonded to M through a substituent, M is a Group VIA metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, and siloxyalkyl having up to 20 non-hydrogen atoms and neutral Lewis base ligands having up to 20 non-hydrogen atoms or optionally one X together with Cp forms a metallocycle with M and n is dependent upon the valency of the metal.

11. The process according to claim 9, wherein the metallocene is represented by the general formula:

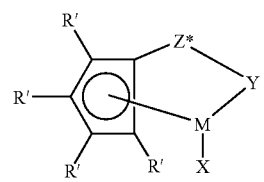

wherein:
R' each occurrence is independently selected from the group consisting of hydrogen, hydrocarbyl, silyl, germyl, halo, cyano, and combinations thereof, said R' having up to 20 non-hydrogen atoms, and optionally, two R' groups (where R' is not hydrogen, halo or cyano) together form a divalent derivative thereof connected to adjacent positions of the cyclopentadienyl ring to form a fused ring structure;

X is a neutral η$^4$ bonded diene group having up to 30 non-hydrogen atoms, which forms a Tr-complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or

GeR*$_2$, wherein:

R* each occurrence is independently hydrogen, or a member selected from the group consisting of hydrocarbyl, silyl, halogenated alkyl, halogenated aryl, and combinations thereof, said R* having up to 10 non-hydrogen atoms, and optionally, two R* groups from Z* (when R* is not hydrogen), or a R* group from Z* and a R* group from Y form a ring system.

12. The process according to claim 1, wherein the ionic activator has the general formula:

$$(L^*-H)^+_d (A^{d-})$$

wherein

L* is a neutral Lewis base, $(L^*-H)^+_d$ is a Bronsted acid, $A^{d-}$ is a non-coordinating compatible anion having a charge of d⁻, and d is an integer from 1 to 3.

* * * * *

UNITED STATES PATENT AND TRADEMARK OFFICE
CERTIFICATE OF CORRECTION

PATENT NO.         : 7,271,226 B2  
APPLICATION NO. : 10/525730  
DATED                  : September 18, 2007  
INVENTOR(S)         : Grant Berent Jacobsen et al.

It is certified that error appears in the above-identified patent and that said Letters Patent is hereby corrected as shown below:

Title Page;  
Item 57, Abstract, lines 2-3, "polymeristation" should read -- polymerisation --.

Claim 11, col. 10, line 59, "Tr-complex" should read -- $\pi$- complex --.

Claim 12, col. 12, line 1, "$(L^*-H)^{30}$" should read -- $(L^*-H)^+$ --.

Signed and Sealed this

Thirteenth Day of January, 2009

JON W. DUDAS  
*Director of the United States Patent and Trademark Office*